Jan. 22, 1929.
I. V. EDGERTON
POULTRY CAR
Filed Sept. 26, 1925
1,699,525
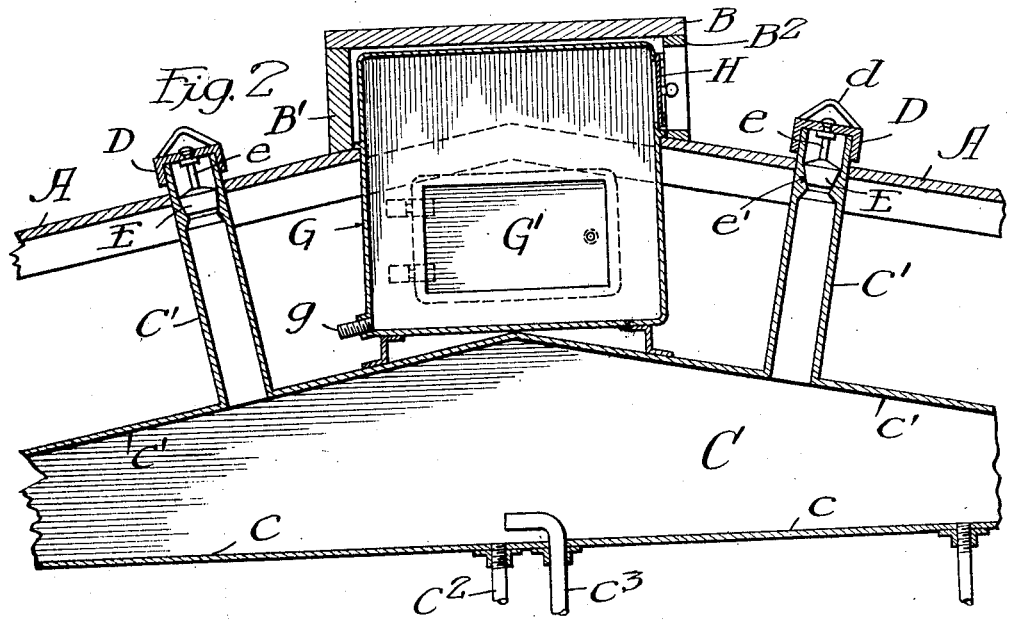
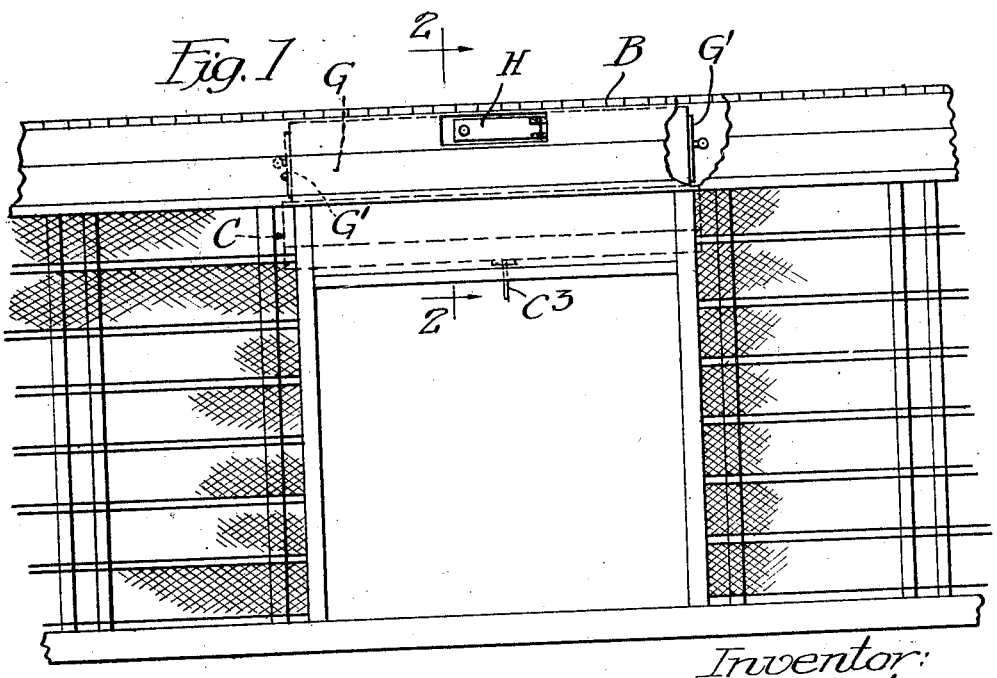
Inventor:
Israel V. Edgerton,
by Fisher, Towle, Clapp & Soans, Attys.

Patented Jan. 22, 1929.

1,699,525

UNITED STATES PATENT OFFICE.

ISRAEL V. EDGERTON, OF CHICAGO, ILLINOIS, ASSIGNOR TO PALACE POULTRY CAR COMPANY, OF CHICAGO, ILLINOIS, A CORPORATION OF ILLINOIS.

POULTRY CAR.

Application filed September 26, 1925. Serial No. 58,754.

This invention has relation to an improvement of railway cars or trucks more particularly designed for the transportation of live poultry at all seasons of the year, an example of such type of car being shown in Patent No. 1,512,215, granted to me October 21, 1924.

The main object of the invention is to provide an improved structure and arrangement of ice tank, which will serve to both cool the air in the car in warm weather, and facilitate circulation of air between the poultry compartments on opposite sides of the central compartment when the usual doors of the latter opening into the poultry compartments are closed, as at night.

The invention consists in the features of novelty hereinafter described, illustrated in the accompanying drawing and particularly set forth in the claims at the end of this specification.

Figure 1 is a view in side elevation showing the central portion of a poultry car body having my invention applied thereto. Figure 2 is a view upon an enlarged scale in vertical section on line 2—2 of Fig. 1.

As the main body of the car is similar to that set forth in my above mentioned Letters Patent No. 1,512,215, I have not deemed it necessary to illustrate the details thereof.

The body of the car will be provided with a central compartment opposite the usual side door openings and, when designed to transport poultry, with tiers of superposed coops extending from said central compartment to the opposite ends of the car, these coops being indicated in Fig. 1 of the drawing.

In practice, it is found desirable, particularly in very hot weather, to provide means for cooling the air in the car, not only to relieve the fowls and particularly those in the upper tiers of coops, but also for the benefit of the attendant who usually rides within the car. To this end, I provide a water tank extending above the central compartment of the car and approximately from side to side thereof, this tank being spaced at a distance below the car roof so as to permit a free circulation of air above as well as below the tank. In order to further modify the temperature of the air, I provide an ice chamber located above the tank, this chamber being provided with end doors so that upon opening said doors a free circulation of air between the two poultry compartments may be had through the ice box; the air in warm weather flowing over and through the ice in the box and being cooled thereby.

Referring to the drawing, A designates the roof of the car and B denotes the running board that is mounted upon the central elevated portion or "clearstory" B' of the roof. Above the central compartment of the car is mounted a water tank C. As shown, the tank C is a shallow sheet metal tank having a flat bottom $c$ and inclined top walls $c'$, the tank extending approximately from side to side of the car body and occupying a considerable portion of the space above the central compartment of the car. The tank C is spaced at a distance below the roof A of the car so as to allow a free circulation of air above the tank. The bottom of the tank is shown as provided with pipes $c^2$ and $c^3$ that may be connected with a suitable heater (not shown) when, as in cold weather, it is desirable to heat the water within the tank C. From the top of the tank and extending through the roof A of the car project the filling spouts C', the upper ends of these spouts extending a slight distance above the car roof. Upon the upper ends of the spouts C' are fitted the flanged covers D that serve to close the exposed ends of the spouts and prevent access of dust and cinders thereto. Each of the covers D is provided with a suitable handle $d$ and to each of the covers is connected a plug or valve E by a stem $e$, this plug or valve $e$ being adapted to engage a valve seat $e'$ on the interior of the spout C'. The cover D, with the valve or plug E connected thereto, serves to tightly close the upper end of the spout C', and inasmuch as the cover and valve E are connected together, all danger of these parts working loose, incident to the motion of the car, is avoided.

Above the water tank C is mounted an ice chamber G. As shown, this ice chamber G is an oblong metal tank the upper portion of which extends through an opening into the raised portion or "clearstory" B' of the car roof beneath the running board B. Each end of the ice chamber G is provided with a door G' that will be held closed by any convenient means. Since the two poultry compartments on opposite sides of the central compartment are separated by the transverse walls and doors of the central compartment, by opening the doors G' of the ice box, air can circulate freely from one compartment to the other through the ice box, thereby improving the ventilation of the poultry compartments. At one side, in the upper portion of the ice chamber, is formed an opening whereby ice may be delivered to the chamber from the exterior of the car, this opening being provided with a suitable door H whereby the filling opening will be normally closed. The side $B^2$ of the elevated part or clearstory of the car roof opposite the door H of the ice chamber will be cut away to enable the ice to be delivered to the door opening. The bottom of the ice chamber G will be provided with a suitable drain pipe $g$.

By the arrangement above described, it will be seen that as the air in the central compartment occupied by the attendant circulates over and around the tank C and about the sides of the ice chamber G, it will be cooled, if the water in the tank C be cold and there is ice in the chamber G, while in cold weather, if there be no ice in the chamber G and the water in the tank C be heated, the air circulating around the tank C will have its temperature raised. Inasmuch as the ice chamber G extends longitudinally of the central compartment and in line with the aisles that extend between the tiers of coops in the end portions of the car, the air cooled by passage through the ice chamber will be most effectively distributed to the coops.

Having thus described my invention, what I claim as new and desire to secure by Letters Patent is:—

1. A car of the character described, having end compartments and a central compartment and a longitudinally extending raised portion or clearstory above its roof, said car being provided with a chamber located above said central compartment and extending into said clearstory and having doors at its ends below the roof adapted, when opened, to permit flow of air therethrough from one end compartment to the other.

2. A car of the character described, having end compartments and a central compartment and a longitudinally extending raised portion or clearstory above its roof, said car being provided with an ice chamber located above said central compartment and extending into said clearstory and having doors at its ends below the roof adapted, when opened, to permit flow of air therethrough from one end compartment to the other, said chamber having a filling opening in the upper portion thereof lying in said clearstory, and a door guarding said opening.

ISRAEL V. EDGERTON.